(12) United States Patent
Kawamura et al.

(10) Patent No.: US 9,300,149 B2
(45) Date of Patent: Mar. 29, 2016

(54) REGULATOR, BATTERY CHARGING APPARATUS AND BATTERY CHARGING METHOD TO PREVENT VOLTAGE OF A BATTERY FROM INCREASING BEYOND A FULL-CHARGE VOLTAGE DURING CHATTERING

(75) Inventors: Asato Kawamura, Hanno (JP); Tokihiko Iwakura, Hanno (JP)

(73) Assignee: Shindengen Electric Manufacturing Co., Ltd., Tokyo (JP)

( * ) Notice: Subject to any disclaimer, the term of this patent is extended or adjusted under 35 U.S.C. 154(b) by 476 days.

(21) Appl. No.: 13/990,417

(22) PCT Filed: Dec. 13, 2011

(86) PCT No.: PCT/JP2011/078737
§ 371 (c)(1),
(2), (4) Date: May 29, 2013

(87) PCT Pub. No.: WO2013/088503
PCT Pub. Date: Jun. 20, 2013

(65) Prior Publication Data
US 2014/0285158 A1   Sep. 25, 2014

(51) Int. Cl.
*H02J 7/06* (2006.01)
*H02J 7/00* (2006.01)
(Continued)

(52) U.S. Cl.
CPC .............. *H02J 7/0036* (2013.01); *H02J 7/0052* (2013.01); *H02J 7/027* (2013.01); *H02J 7/04* (2013.01);
(Continued)

(58) Field of Classification Search
CPC ......... H02J 7/0036; H02J 7/0052; H02J 7/04; H02J 7/027; H02J 2007/0037; H02J 2007/0049; H02J 7/0013; H02J 2007/0059; H02M 7/1623
See application file for complete search history.

(56) References Cited

U.S. PATENT DOCUMENTS

| 5,214,369 A | 5/1993 | McCrea | |
| 2007/0164713 A1* | 7/2007 | Suzuki | H02J 7/1438 322/28 |
| 2010/0327817 A1* | 12/2010 | Tabuta | H01M 10/44 320/148 |

FOREIGN PATENT DOCUMENTS

| JP | 10-066279 | 3/1998 |
| JP | 10-201125 | 7/1998 |
| JP | 11-225446 | 8/1999 |

OTHER PUBLICATIONS

IPRP for related PCT/JP2011/078737 issued on Jun. 17, 2014 and its English translation.
(Continued)

*Primary Examiner* — Yalkew Fantu
*Assistant Examiner* — Manuel Hernandez
(74) *Attorney, Agent, or Firm* — Ladas & Parry, LLP

(57) ABSTRACT

[Problem to be Solved]
To provide a regulator capable of more appropriately preventing the voltage of a battery from increasing beyond a full-charge voltage during a battery chattering.
[Solution]
A regulator 1 includes a rectifying circuit 2, a first battery detecting circuit 3, a first full-charge detecting circuit 4, a first differentiating circuit 5 having a fifth resistor r5 connected between a first terminal T1 and one end of a first capacitor C1 and a second capacitor connected in series with the fifth resistor r5 between the first terminal T1 and one end of the first capacitor C1, and a first driving circuit DR that controls the rectifying circuit 2 to rectify an alternating current according to output of an alternating-current generator ACG and controls the rectifying circuit 2 to operate or stop according to signal at one end of a first battery connecting switch element SW1.

15 Claims, 7 Drawing Sheets

(51) Int. Cl.
 *H02J 7/04* (2006.01)
 *H02J 7/02* (2006.01)
 *H02M 7/162* (2006.01)

(52) U.S. Cl.
 CPC ........ *H02J 7/0013* (2013.01); *H02J 2007/0037* (2013.01); *H02J 2007/0049* (2013.01); *H02J 2007/0059* (2013.01); *H02M 7/1623* (2013.01)

(56) References Cited

OTHER PUBLICATIONS

International Search Report for PCT/JP2011/078737, mailed on Mar. 19, 2013.
ESSR from related European Appl. No. 11876039.6 dated Dec. 14, 2015.

\* cited by examiner

100A
Prior Art

REGULATOR, BATTERY CHARGING APPARATUS AND BATTERY CHARGING METHOD TO PREVENT VOLTAGE OF A BATTERY FROM INCREASING BEYOND A FULL-CHARGE VOLTAGE DURING CHATTERING

CROSS REFERENCE TO RELATED APPLICATION

This application is the national stage of International Patent Application no. PCT/JP2011/078737, filed on Dec. 13, 2011, the disclosure of which is incorporated herein in its entirety.

TECHNICAL FIELD

The present invention relates to a regulator that controls charging of a battery, a battery charging apparatus and a battery charging system.

BACKGROUND ART

In battery charging, a regulator 1A in a conventional battery charging apparatus 100A (see JP11-225446A, Patent Literature 1) rectifies an output current of an alternating-current generator "ACG" through a rectifying circuit 2 before charging a battery "B" (see FIG. 5), for example.

The conventional battery charging apparatus 100A includes the rectifying circuit 2, a battery detecting circuit 3 that detects whether or not the battery "B" is connected to the battery charging apparatus 100A, a full-charge detecting circuit 4 that detects a full charge of the battery "B", and a driving circuit "DR" that controls driving and stopping of the rectifying circuit 2.

With the conventional battery charging apparatus 100A, in a state where a load "R" connected to the battery "B" is light or no load is connected to the battery "B", the battery voltage can increase more than required if a screw securing the battery "B" loosens and a chattering occurs (a switch element "SW" is repeatedly turned on and off), for example.

For example, at an instant when the battery "B" is connected (the switch element "SW" is turned on), a current flows through a first path (1). Then, an average-value capacitor C1 in the full-charge detecting circuit 4 starts being charged, so that the start of operation of a transistor Tr2 in the full-charge detecting circuit 4 is delayed (see FIG. 6).

In the battery detecting circuit 3, the current flowing through the first path (1) triggers operation of a transistor Tr1, thereby causing a current to flow through a second path (2).

The current flowing through the second path (2) triggers operation of the first driving circuit "DR", thereby causing a current to flow to the gates of thyristors to turn on the thyristors.

As a result, a current flows from the alternating-current generator "ACG" to a third path (3) through the rectifying circuit 2, and the battery "B" is charged.

On the other hand, when the battery "B" is released (the switch element "SW" is turned off), a current flows through the fourth path (4), and the average-value capacitor C1 in the full-charge detecting circuit 4 discharges (see FIG. 7).

In short, during a battery chattering, connection and release of the battery "B" successively occurs, the start of operation of the transistor Tr2 in the full-charge detecting circuit 4 is delayed each time the battery is connected, and thus, the battery "B" is excessively charged.

The above-described problem that the battery voltage increases more than required can arise in this way.

As described above, the regulator 1A according to prior art has a problem that the battery voltage increases beyond a full-charge voltage when a battery chattering occurs.

BRIEF SUMMARY OF THE INVENTION

A regulator, according to an embodiment which is an aspect of the present invention, controls charging, by an alternating-current generator, of a first battery connected between a first terminal and a second terminal, the regulator comprising:

a rectifying circuit that rectifies an alternating current output from an output terminal of each phase of the alternating-current generator and outputs a charging current to the first battery;

a first battery detecting circuit having a first resistor connected to the first terminal at a first end thereof a second resistor connected between a second end of the first resistor and the second terminal and a first switch element connected to the second terminal at a first end thereof and to the second end of the first resistor at a control terminal thereof;

a first full-charge detecting circuit having a third resistor connected to the first terminal at a first end thereof, a fourth resistor connected between a second end of the third resistor and the second terminal, a first capacitor connected to the second end of the third resistor at a first end thereof and to the second terminal at a second end thereof and a second switch element connected to the control terminal of the first switch element at a first end thereof, to the second terminal at a second end thereof and to the first end of the first capacitor at a control terminal thereof;

a first differentiating circuit having a fifth resistor connected between the first terminal and the first end of the first capacitor and a second capacitor connected in series with the fifth resistor between the first terminal and the first end of the first capacitor; and a first driving circuit that controls the rectifying circuit to rectify the alternating-current according to an output of the alternating-current generator and controls the rectifying circuit to perform or stop an operation to rectify the alternating current and supply power to the first battery according to a signal at the second end of the first switch element.

In the regulator,
the first driving circuit makes
the rectifying circuit perform the operation to rectify the alternating current and supply power to the first battery if the first switch element is in an on state, and
the rectifying circuit stop the operation to rectify the alternating current and supply power to the first battery if the first switch element is in an off state.

In the regulator,
the first driving circuit makes
the rectifying circuit perform the operation to rectify the alternating current and supply power to the first battery if a current flows to the other end of the first switch element, and
the rectifying circuit stop the operation to rectify the alternating current and supply power to the first battery if no current flows to the other end of the first switch element.

In the regulator,
the first differentiating circuit further has:
a first diode connected to the first end of the first capacitor at a cathode thereof; and
a second diode connected to an anode of the first diode at a cathode thereof and to the second terminal at an anode thereof, and the fifth resistor and the second capacitor are connected in series between the first terminal and the anode of the first diode.

In the regulator,
the first full-charge detecting circuit further comprises a first Zener diode that is connected so as to be reverse biased between the first terminal and the one end of the third resistor.

In the regulator,
a plurality of the first Zener diodes are connected in series between the first terminal and the one end of the third resistor.

In the regulator,
the first full-charge detecting circuit further comprises a sixth resistor that is connected to the one end of the third resistor at one end thereof and to the second terminal at the other end thereof.

In the regulator,
the rectifying circuit comprises:
a first thyristor that is connected to an output terminal of a first phase of the alternating-current generator at an anode thereof and to the first terminal at a cathode thereof; and
a second thyristor that is connected to the output terminal of the first phase of the alternating-current generator at a cathode thereof and to the second terminal at an anode thereof.

In the regulator,
the first driving circuit is configured to apply a drive signal to gates of the first thyristor and the second thyristor, thereby controlling the rectifying circuit.

In the regulator, the regulator further comprises a third diode that is connected so as to be forward biased between the second terminal and the other end of the rectifying circuit.

In the regulator,
the first switch element and the second switch element are transistors.

In the regulator,
the transistors are bipolar transistors.

In the regulator,
the bipolar transistors are NPN-type bipolar transistors.

In the regulator,
the regulator controls charging, by the alternating-current generator, of the first battery connected between the first terminal and the second terminal and a second battery connected between a third terminal and a fourth terminal,
the rectifying circuit rectifies the alternating current output from the output terminal of each phase of the alternating-current generator and outputs a charging current to the first battery and the second battery, and
the regulator further has:
a second battery detecting circuit having a seventh resistor connected to the third terminal at a first end thereof, an eighth resistor connected between a second end of the seventh resistor and the fourth terminal and a third switch element connected to the fourth terminal at a first end thereof and to the second end of the seventh resistor at a control terminal thereof;
a second full-charge detecting circuit having a ninth resistor connected to the third terminal at a first end thereof, a tenth resistor connected between a second end of the ninth resistor and the fourth terminal, a third capacitor connected to the second end of the ninth resistor at a first end thereof and to the fourth terminal at a second end thereof and a fourth switch element connected to the control terminal of the third switch element at a first end thereof, to the fourth terminal at a second end thereof and to the first end of the third capacitor at a control terminal thereof;
a second differentiating circuit having an eleventh resistor connected between the third terminal and the first end of the third capacitor and a fourth capacitor connected in series with the eleventh resistor between the third terminal and the first end of the third capacitor;
a second driving circuit that controls the rectifying circuit to rectify the alternating current according to an output of the alternating-current generator and controls the rectifying circuit to perform or stop the operation to rectify the alternating current and supply power to the first battery according to a signal at the second end of the third switch element; and
a switch circuit that is connected between the third terminal and the first end of the seventh resistor and is turned on and off under the control of a signal at the first end of the second switch element.

In the regulator,
the switch circuit is turned on if the second switch element is turned on and turned off if the second switch element is turned off.

In the regulator,
the switch circuit is turned on if a current flows to the first end of the second switch element and turned off if no current flows to the first end of the second switch element.

In the regulator,
the second full-charge detecting circuit further comprises a twelfth resistor that is connected to the one end of the ninth resistor at one end thereof and to the fourth terminal at the other end thereof.

A battery charging apparatus that charges a battery, comprising:
an alternating-current generator that supplies an alternating-current voltage with which the battery is to be charged; and
the regulator.

A battery charging method, according to an embodiment which is an aspect of the present invention, charges a first battery by using a regulator that controls charging, by an alternating-current generator, of the first battery connected between a first terminal and a second terminal, the regulator comprising: a rectifying circuit that rectifies an alternating current output from an output terminal of each phase of the alternating-current generator and outputs a charging current to the first battery; a first battery detecting circuit having a first resistor connected to the first terminal at a first end thereof a second resistor connected between a second end of the first resistor and the second terminal and a first switch element connected to the second terminal at a first end thereof and to the second end of the first resistor at a control terminal thereof; a first full-charge detecting circuit having a third resistor connected to the first terminal at a first end thereof, a fourth resistor connected between a second end of the third resistor and the second terminal, a first capacitor connected to the second end of the third resistor at a first end thereof and to the second terminal at a second end thereof and a second switch element connected to the control terminal of the first switch element at a first end thereof, to the second terminal at a second end thereof and to the first end of the first capacitor at a control terminal thereof; a first differentiating circuit having a fifth resistor connected between the first terminal and the first end of the first capacitor and a second capacitor connected in series with the fifth resistor between the first terminal and the first end of the first capacitor; and a first driving circuit that controls the rectifying circuit to rectify the alternating-current according to an output of the alternating-current generator and controls the rectifying circuit to perform or stop an operation to rectify the alternating current and supply power to the first battery according to a signal at the second end of the first switch element, the battery charging method comprising:

making the rectifying circuit perform the operation to rectify the alternating current and supply power to the first battery if the first switch element is in an on state, and making the rectifying circuit stop the operation to rectify the alternating current and supply power to the first battery if the first switch element is in an off stat.

As described above, a regulator according to an aspect of the present invention differs from a conventional regulator in that the regulator further includes a first differentiating circuit, which includes a fifth resistor connected between a first terminal and one end of a first capacitor, a second capacitor connected in series with the fifth resistor between the first terminal and the one end of the first capacitor, a first diode connected to the one end of the first capacitor at a cathode thereof, and a second diode connected to an anode of the first diode at a cathode thereof and to a second terminal at an anode thereof.

As a result, at the instant when a first battery is connected to the battery charging apparatus, the first differentiating circuit can charge an average-value capacitor in a first full-charge detecting circuit to reduce a delay of the operation of a transistor in a first full-charge detecting circuit.

In this way, the battery voltage can be prevented from increasing more than required.

In addition, when the first battery is released, the second diode causes the second capacitor to discharge, and therefore, the differentiating operation of the first differentiating circuit can be maintained.

In other words, the regulator according to an aspect of the present invention can more appropriately prevent the battery voltage from increasing beyond a full-charge voltage during a battery chattering.

BRIEF DESCRIPTION OF DRAWINGS

FIG. 2 is a diagram showing flows of currents that occur when the first battery connecting switch element "SW" in the battery charging apparatus 100 shown in FIG. 1 is turned on.

FIG. 6 is a diagram showing flows of currents that occur when the first battery connecting switch element "SW" in the conventional battery charging apparatus 100A shown in FIG. 5 is turned on.

DESCRIPTION OF EMBODIMENTS

In the following, embodiments of the present invention will be described with reference to the drawings.

Embodiment 1

Figure 1:
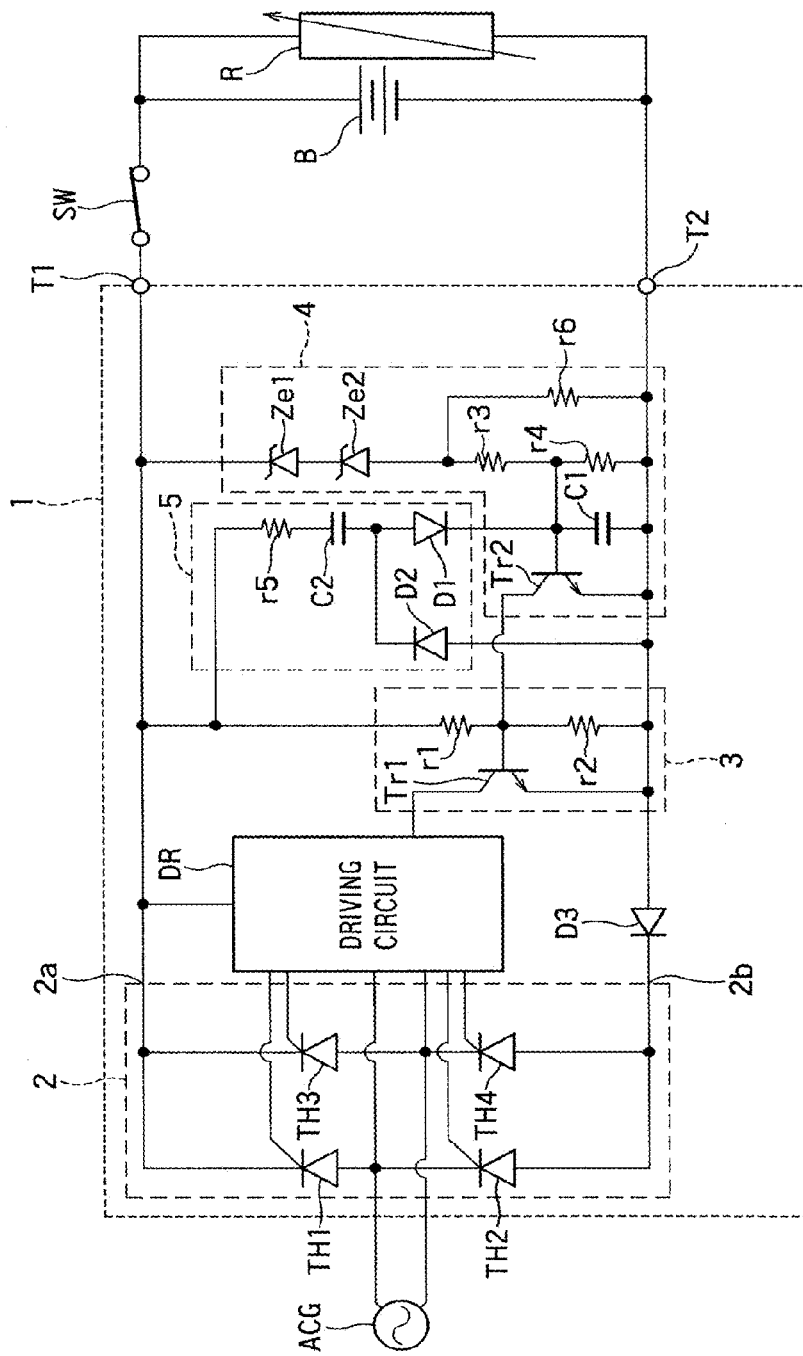
FIG. 1 is a circuit diagram showing an example of a configuration of a battery charging apparatus 100 according to an embodiment 1, which is an aspect of the present invention.

FIG. 1 is a circuit diagram showing an example of a configuration of a battery charging apparatus 100 according to an embodiment 1, which is an aspect of the present invention.

As shown in FIG. 1, the battery charging apparatus 100 for charging a first battery "B" includes an alternating-current generator "ACG" that supplies an alternating-current voltage to charge the first battery and a regulator 1.

The regulator 1 is configured to control charging, by the alternating-current generator "ACG", of the first battery "B" connected between a first terminal T1 and a second terminal T2.

The first battery "B" is connected in parallel with a first external load "R" between the first terminal T1 and the second terminal T2. A first battery connecting switch element "SW" is provided between the first terminal T1 and the first battery "B". Turning on and off of the first battery connecting switch element "SW" correspond to connection and disconnection between the regulator 1 and the first battery "B". In the state shown in FIG. 1, the first battery connecting switch element "SW" is in the on state, and the regulator 1 and the first battery "B" are connected to each other.

As shown in FIG. 1, the regulator 1 includes a rectifying circuit 2, a first battery detecting circuit 3, a first full-charge detecting circuit 4, a first differentiating circuit 5 and a third diode D3.

The rectifying circuit 2 is connected to the first terminal T1 at one end 2a thereof and to the second terminal T2 at another end 2b thereof. The rectifying circuit 2 is configured to rectify an alternating current output from an output terminal of each phase of the alternating-current generator "ACG" and outputs a charging current to the first battery "B".

As shown in FIG. 1, the rectifying circuit 2 includes a first thyristor TH1, a second thyristor TH2, a first thyristor TH3 and a second thyristor TH4, for example.

The first thyristor TH1 is connected to an output terminal of a first phase of the alternating-current generator "ACG" at an anode thereof and to the first terminal T1 at a cathode thereof.

The second thyristor TH2 is connected to the output terminal of the first phase of the alternating-current generator "ACG" at a cathode thereof and to the second terminal T2 at an anode thereof.

The first thyristor TH3 is connected to an output terminal of a second phase of the alternating-current generator "ACG" at an anode thereof and to the first terminal T1 at a cathode thereof.

The second thyristor TH4 is connected to the output terminal of the second phase of the alternating-current generator "ACG" at a cathode thereof and to the second terminal T2 at an anode thereof.

A first driving circuit "DR" applies a drive signal to the gates of the first and second thyristors TH1 to TH4 to drive the first and second thyristors TH1 to TH4, that is, the rectifying circuit 2. The alternating current output from the output terminal of each phase of the alternating-current generator "ACG" is rectified by the operations of the first and second thyristors TH1 to TH4.

As shown in FIG. 1, the first battery detecting circuit 3 includes a first resistor r1, a second resistor r2 and a first switch element (an NPN-type bipolar transistor) Tr1, for example.

The first resistor r1 is connected to the first terminal T1 at one end thereof.

The second resistor r2 is connected between the other end of the first resistor r1 and the second terminal T2.

The first switch element Tr1 is connected to the second terminal T2 at one end (emitter) thereof, to the first driving circuit "DR" at another end (collector) thereof and to the other end of the first resistor r1 at a control terminal (base) thereof.

Although the first switch element Tr1 is a bipolar transistor in this example, the first switch element Tr1 may be an MOS transistor.

The first full-charge detecting circuit 4 includes a third resistor r3, a fourth resistor r4, a sixth resistor r6, a first capacitor (an average-value capacitor) C1, a second switch element (an NPN-type bipolar transistor) Tr2 and first Zener diodes Ze1 and Ze2.

The third resistor r3 is connected to the first terminal T1 at one end thereof.

The fourth resistor r4 is connected between the other end of the third resistor r3 and the second terminal T2.

The first capacitor C1 is connected to the other end of the third resistor r3 at one end thereof and to the second terminal T2 at the other end.

The second switch element Tr2 is connected to the control terminal (base) of the first switch element Tr1 at one end (collector) thereof, to the second terminal T2 at another end (emitter) thereof and to the one end of the first capacitor C1 at a control terminal (base) thereof. Although the second switch element Tr2 is a bipolar transistor in this example, the second switch element Tr2 may be an MOS transistor.

The sixth resistor r6 is connected to the one end of the third resistor r3 at one end thereof and to the second terminal T2 at the other end thereof.

The first Zener diodes Ze1 and Ze2 are connected in series between the first terminal T1 and the one end of the third resistor r3.

The first Zener diodes Ze1 and Ze2 are connected so as to be reverse biased between the first terminal T1 and the one end of the third resistor r3. More specifically, a cathode of the first Zener diode Ze1 is connected to the first terminal T1, and an anode of the first Zener diode Ze1 is connected to a cathode of the first Zener diode Ze2. An anode of the first Zener diode Ze2 is connected to the one end of the third resistor r3.

The first differentiating circuit 5 includes a fifth resistor r5, a second capacitor C2, a first diode D1 and a second diode D2.

The fifth resistor r5 is connected between the first terminal T1 and the one end of the first capacitor C1.

The second capacitor C2 is connected in series with the fifth resistor r5 between the first terminal T1 and the one end of the first capacitor C1.

The first diode D1 is connected to the one end of the first capacitor C1 at a cathode thereof. In particular, the fifth resistor r5 and the second capacitor C2 are connected in series between the first terminal T1 and an anode of the first diode D1

The second diode D2 is connected to the anode of the first diode D1 at a cathode thereof and to the second terminal T2 at an anode thereof.

As shown in FIG. 1, the third diode D3 is connected so as to be forward biased between the second terminal T2 and the other end 2b of the rectifying circuit 2. More specifically, the third diode D3 is connected to the second terminal T2 at an anode thereof and to the other end 2b of the rectifying circuit 2 at a cathode thereof.

The output of each phase of the alternating-current generator "ACG" is input to the first driving circuit "DR". According to the outputs of the alternating-current generator "ACG", the first driving circuit "DR" is configured to apply a drive signal to the gates of the first thyristors TH1 and TH3 and the second thyristors TH2 and TH4, thereby controlling the rectifying circuit 2 to rectify the alternating current, as described above.

The first driving circuit "DR" is further configured to control the rectifying circuit 2 to perform or stop an operation to rectify the alternating current and supply power to the first battery "B" according to a signal at the other end (collector) (a current flowing to the collector) of the first switch element Tr1.

For example, the first driving circuit "DR" drives the rectifying circuit 2 when the first switch element Tr1 is in the on state. In other words, the first driving circuit "DR" makes the rectifying circuit 2 perform an operation to rectify the alternating current and supply power to the first battery "B" if a current flows to the other end (collector) of the first switch element Tr1.

On the other hand, the first driving circuit "DR" stops the operation of the rectifying circuit 2 when the first switch element Tr1 is in the off state. In other words, the first driving circuit "DR" makes the rectifying circuit 2 stop the operation to rectify the alternating current and supply power to the first battery "B" if no current flows to the other end (collector) of the first switch element Tr1.

Next, an example of an operation of the battery charging apparatus 100 configured as described above (a battery charging method for charging the first battery "B") will be described.

Figure 2:
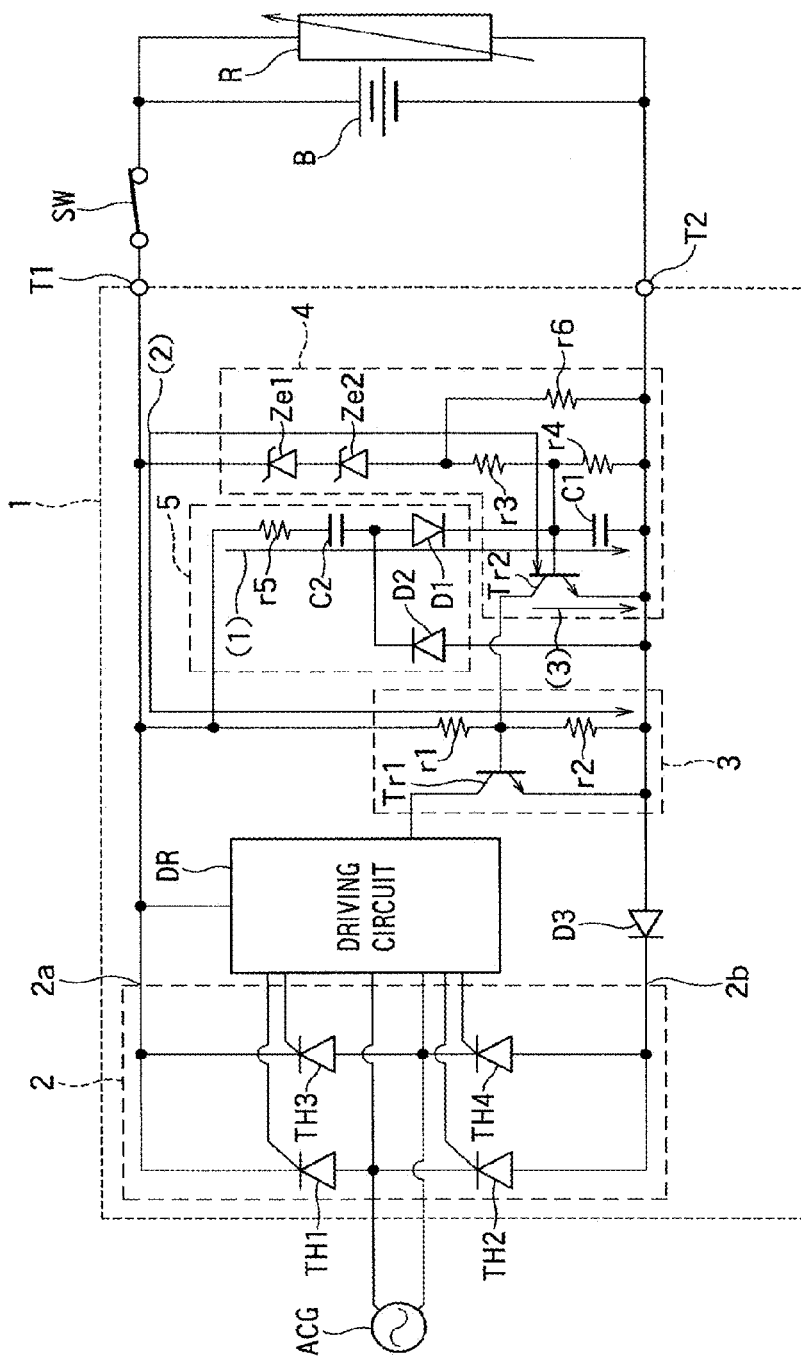
Figure 3:
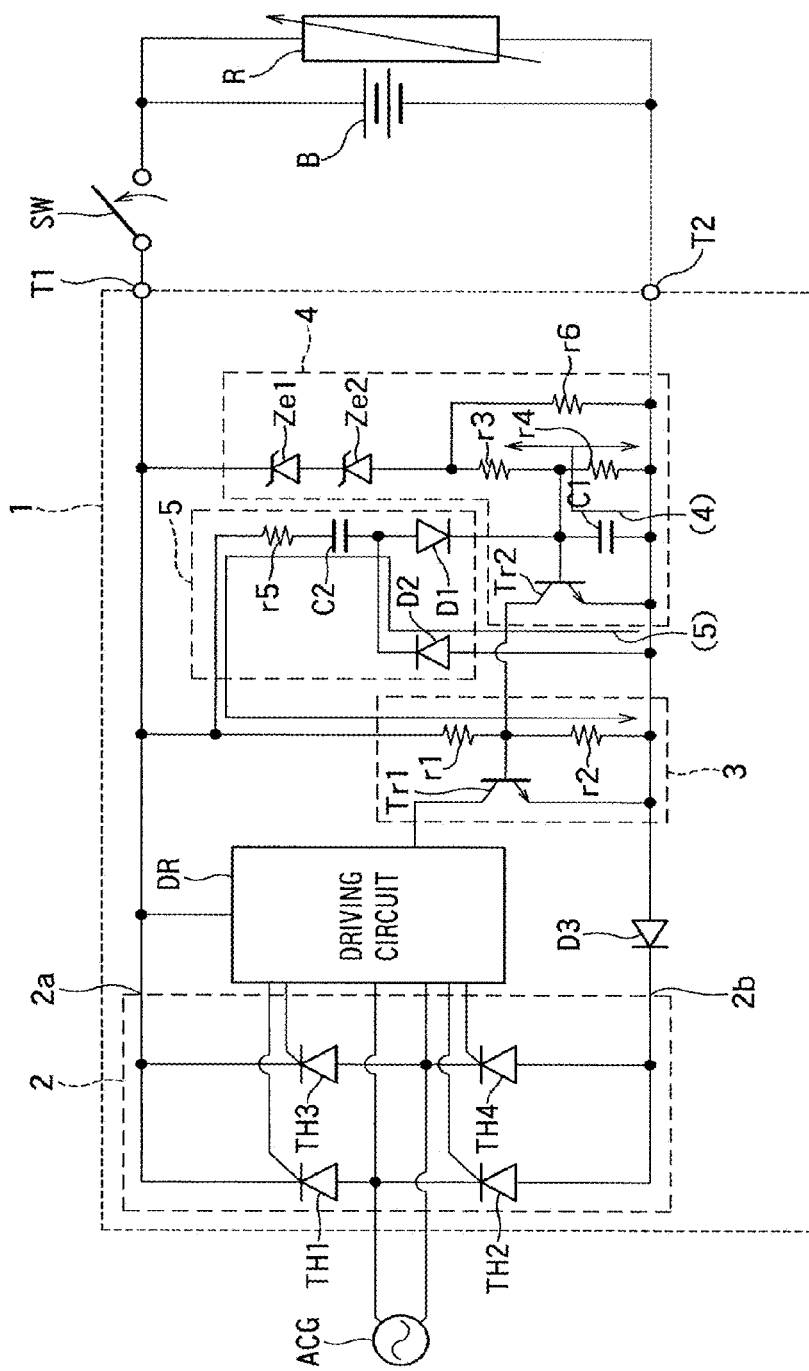
FIG. 3 is a diagram showing flows of currents that occur when the first battery connecting switch element "SW" in the battery charging apparatus 100 shown in FIG. 1 is turned off.

FIG. 2 is a diagram showing flows of currents that occur when the first battery connecting switch element "SW" in the battery charging apparatus 100 shown in FIG. 1 is turned on. FIG. 3 is a diagram showing flows of currents that occur when the first battery connecting switch element "SW" in the battery charging apparatus 100 shown in FIG. 1 is turned off.

As shown in FIG. 2, when the first battery connecting switch element "SW" is turned on (the first battery "B" is connected to the battery charging apparatus 100), a current flows through a first path (1), and the first capacitor (average-value capacitor) C1 in the first full-charge detecting circuit 4 is charged.

Then, a current flows through a second path (2).

Then, since the first capacitor (average-value capacitor) C1 in the first full-charge detecting circuit 4 is charged, the second switch element Tr2 starts operating earlier than the first switch element Tr1, and a current flows through a third path (3). As a result, the first switch element Tr1 is turned off.

As a result of the first switch element Tr1 being turned off, the first driving circuit "DR" stops the operation of the rectifying circuit 2.

On the other hand, as shown in FIG. 3, when the first battery connecting switch element "SW" is turned off (the first battery "B" is removed from the battery charging apparatus 100), a current flows through a fourth path (4), and the first capacitor (average-value capacitor) C1 in the first full-charge detecting circuit 4 discharges.

Furthermore, a current flows through a fifth path (5), and the second capacitor C2 in the first differentiating circuit 5 discharges.

Through the operation described above, when the first battery "B" is connected to the battery charging apparatus 100, the first capacitor (average-value capacitor) C1 is charged also by the first differentiating circuit 5. Therefore, the speed of the operation of the first full-charge detecting circuit 5 increases.

As described above, the regulator 1 according to an aspect of the present invention differs from the conventional regulator 1A in that the regulator 1 further includes the first differentiating circuit 5, which includes the fifth resistor r5 connected between the first terminal T1 and the one end of the first capacitor C1, the second capacitor C2 connected in series with the fifth resistor r5 between the first terminal T1 and the one end of the first capacitor C1, the first diode D1 connected to the one end of the first capacitor C1 at the cathode thereof, and the second diode D2 connected to the anode of the first diode D1 at the cathode thereof and to the second terminal T2 at the anode thereof.

As a result, at the instant when the first battery "B" is connected to the battery charging apparatus 100, the first differentiating circuit 5 can charge the average-value capacitor C1 in the first full-charge detecting circuit 4 to reduce the delay of the operation of the second switch element Tr2 in the first full-charge detecting circuit 4.

In this way, the battery voltage can be prevented from increasing more than required.

In addition, when the first battery "B" is released, the second diode D2 causes the second capacitor C2 to discharge, and therefore, the differentiating operation of the first differentiating circuit 5 can be maintained.

In other words, the regulator 1 according to an aspect of the present invention can more appropriately prevent the battery voltage from increasing beyond the full-charge voltage during a battery chattering.

Embodiment 2

In an embodiment 2, an example in which two batteries are alternately charged will be described.

Figure 4:
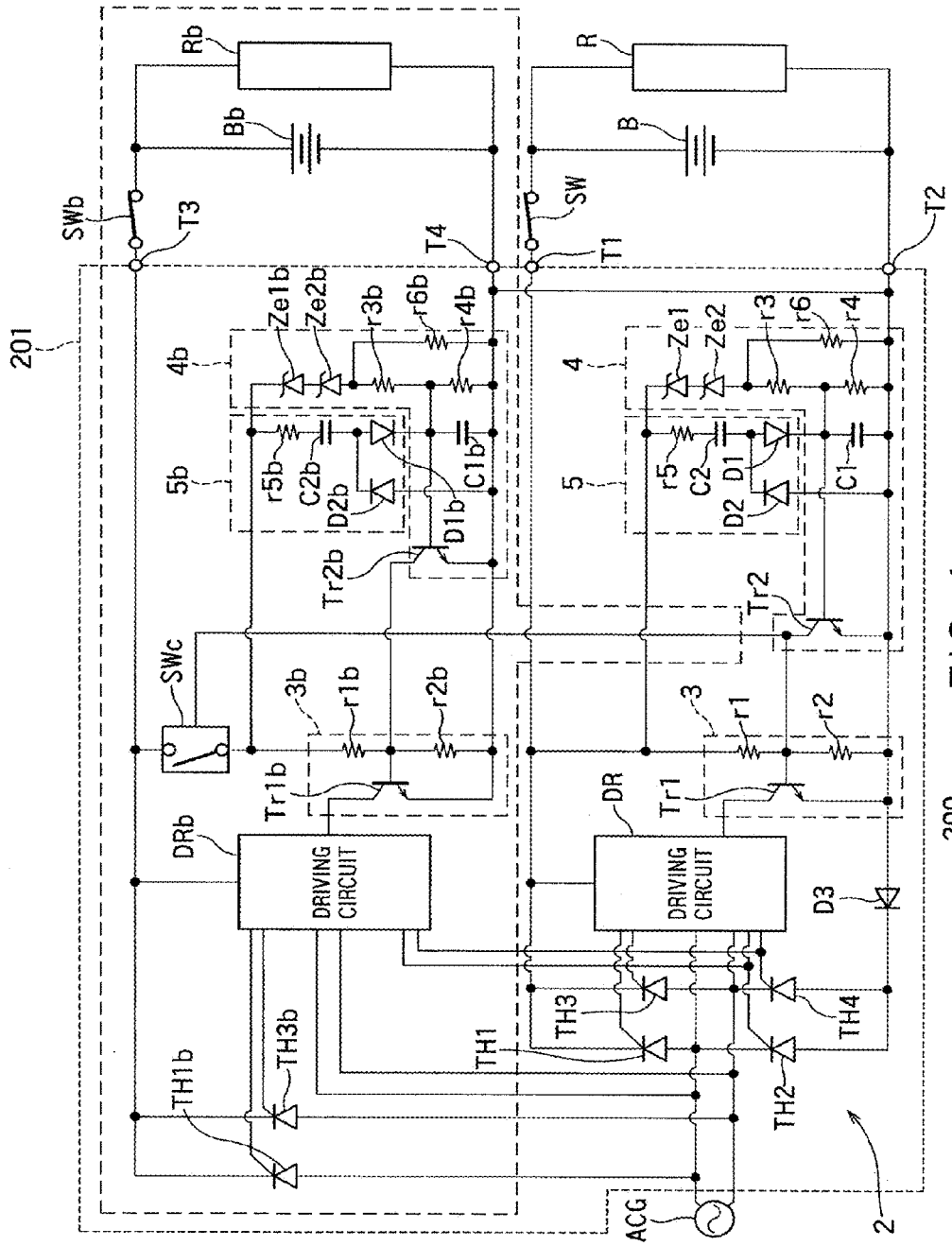
FIG. 4 is a circuit diagram showing an example of a configuration of a battery charging apparatus 200 according to the embodiment 2, which is an aspect of the present invention.
Figure 5:
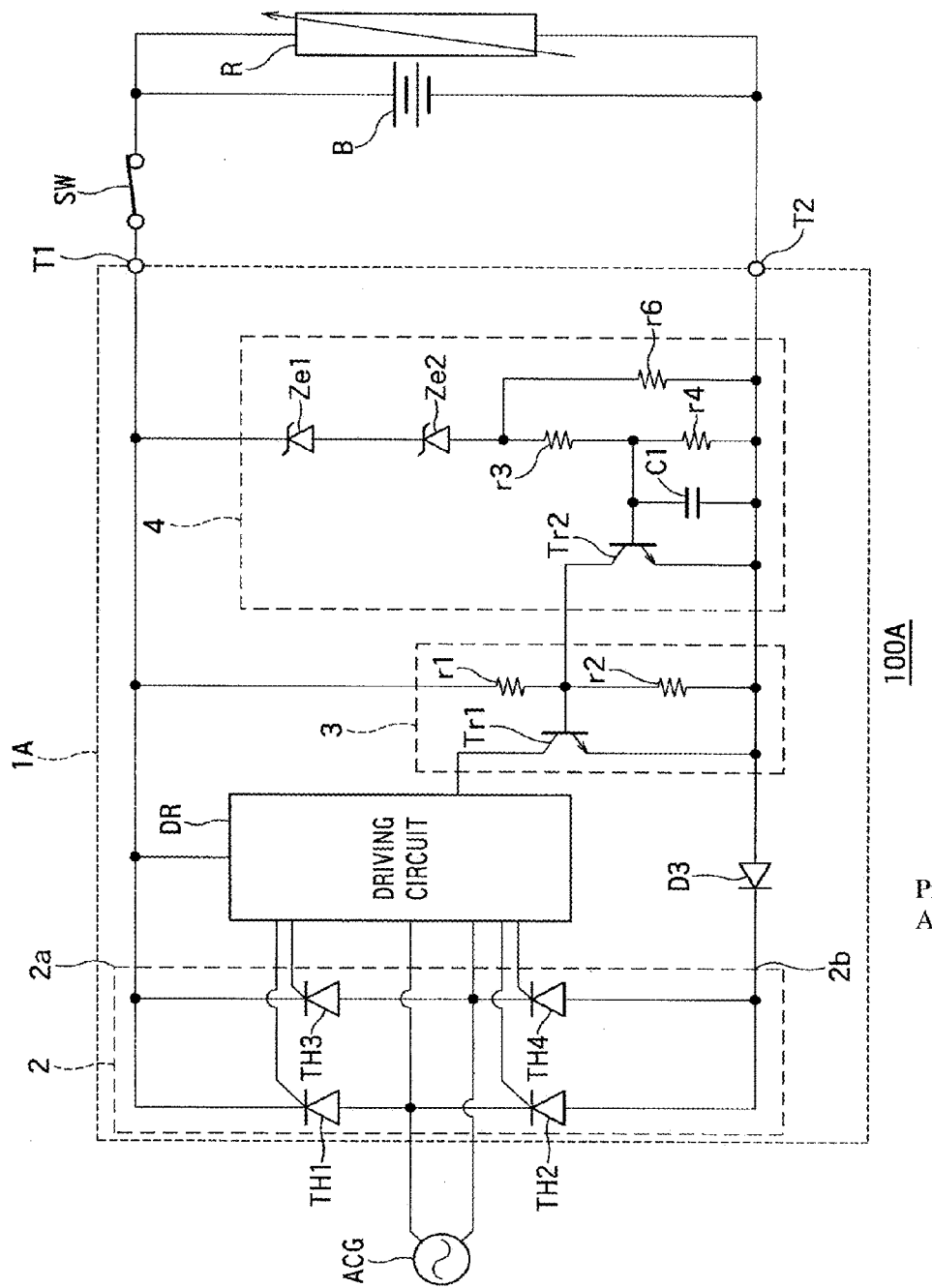
FIG. 5 is a circuit diagram showing an example of a configuration of a conventional battery charging apparatus 100A.
Figure 6:
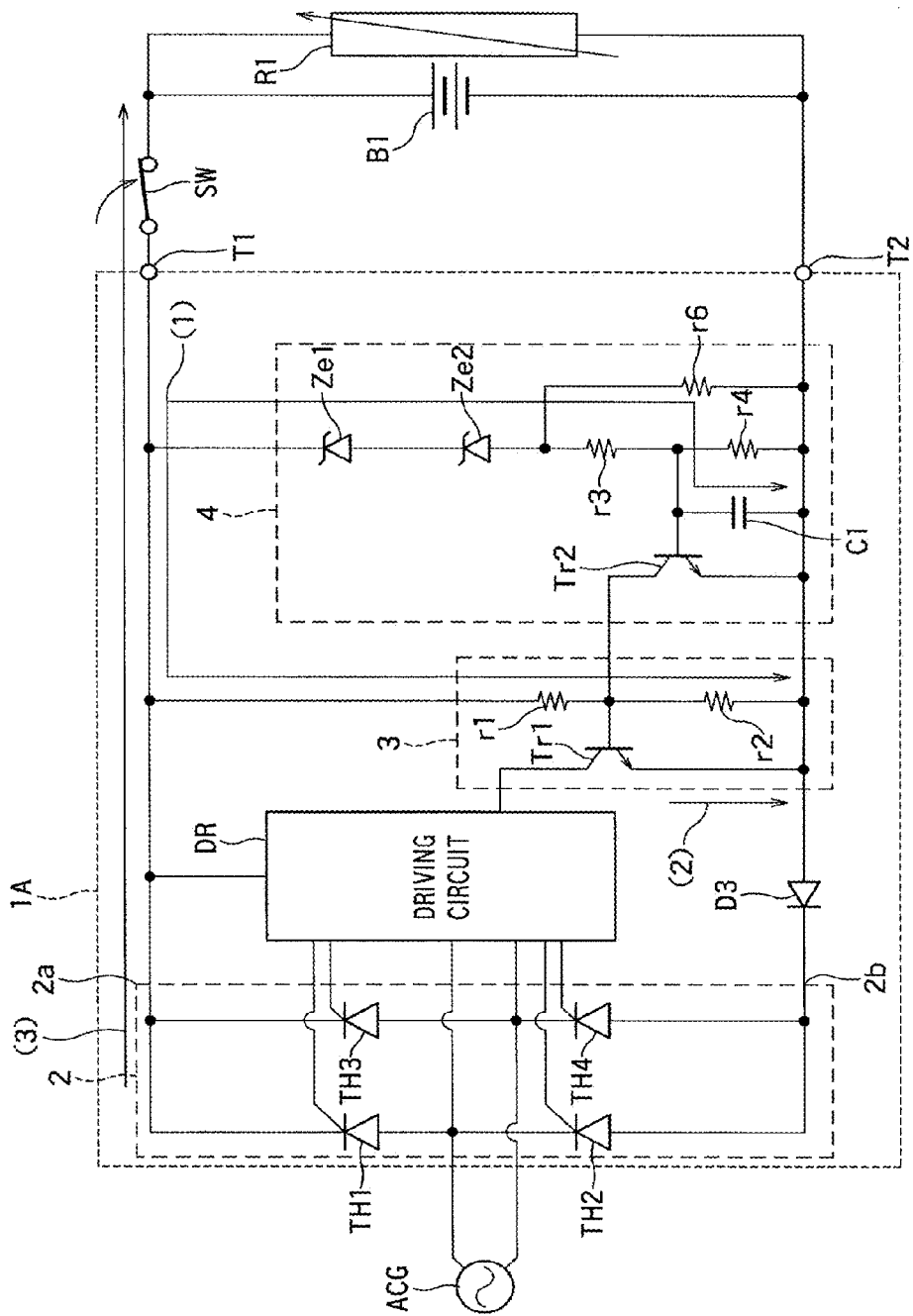
Figure 7:
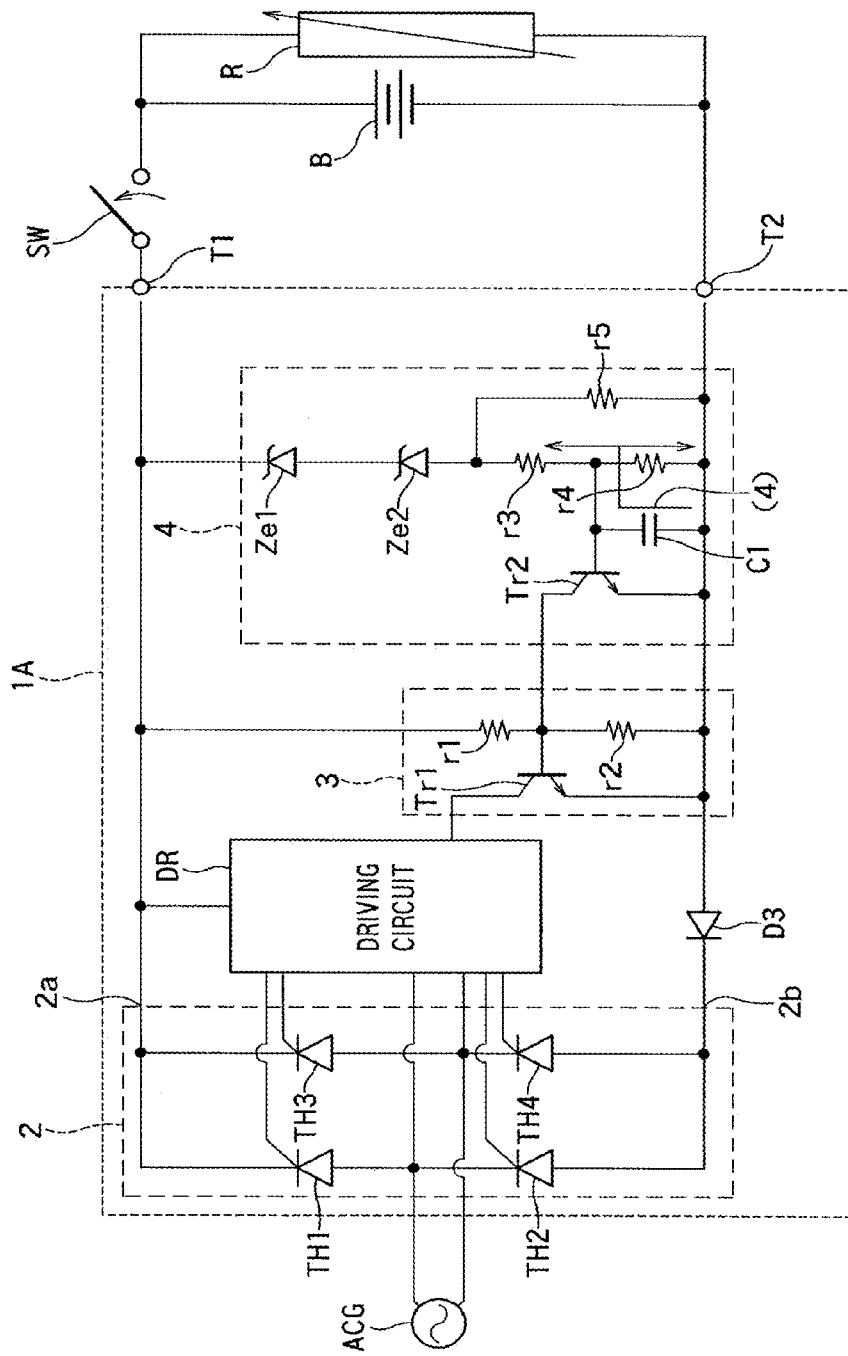
FIG. 7 is a diagram showing flows of currents that occur when the first battery connecting switch element "SW" in the conventional battery charging apparatus 100A shown in FIG. 5 is turned off.

FIG. 4 is a circuit diagram showing an example of a configuration of a battery charging apparatus 200 according to the embodiment 2, which is an aspect of the present invention. In FIG. 4, the same reference numerals as those in FIG. 1 denote the same components as those in the embodiment 1.

As shown in FIG. 4, the battery charging apparatus 200 includes the alternating-current generator "ACG" that supplies an alternating-current voltage to charge the first battery "B" and a second battery "Bb", and a regulator 201.

The regulator 201 is configured to control charging, by the alternating-current generator "ACG", of the first battery "B" connected between the first terminal T1 and the second terminal T2 and the second battery "Bb" connected between a third terminal T3 and a fourth terminal T4. In the example shown in FIG. 4, the fourth terminal and the second terminal are connected to each other and are at the same potential.

The second battery "Bb" is connected in parallel with a second external load "Rb" between the third terminal T3 and the fourth terminal T4. A second battery connecting switch element "SWb" is provided between the third terminal T3 and the second battery "Bb". Turning on and off of the second battery connecting switch element "SWb" correspond to connection and disconnection between the regulator 201 and the second battery "Bb". In the state shown in FIG. 4, the first and second battery connecting switch elements "SW" and "SWb" are in the on state, and the regulator 201 is connected to the first and second batteries "B" and "Bb".

As shown in FIG. 4, the regulator 201 differs from the regulator 1 according to the embodiment 1 in that the regulator 201 further includes a second battery detecting circuit 3b, a second full-charge detecting circuit 4b, a second differentiating circuit 5b and a switch circuit "SWc". In the following, the difference from the embodiment 1 will be particularly described.

The rectifying circuit 2 is configured to rectify the alternating current output from the output terminal of each phase of the alternating-current generator "ACG" and outputs a charging current to the first and second batteries "B" and "Bb".

As shown in FIG. 4, the rectifying circuit 2 includes the first thyristor TH1, the second thyristor TH2, the first thyristor TH3, the second thyristor TH4 and third thyristors TH1b and TH3b, for example.

The first thyristor TH1 is connected to the output terminal of the first phase of the alternating-current generator "ACG" at the anode thereof and to the first terminal T1 at the cathode thereof.

The second thyristor TH2 is connected to the output terminal of the first phase of the alternating-current generator "ACG" at the cathode thereof and to the second terminal T2 at the anode thereof.

The first thyristor TH3 is connected to the output terminal of the second phase of the alternating-current generator "ACG" at the anode thereof and to the first terminal T1 at the cathode thereof.

The second thyristor TH4 is connected to the output terminal of the second phase of the alternating-current generator "ACG" at the cathode thereof and to the second terminal T2 at the anode thereof.

The third thyristor TH1b is connected to the output terminal of the first phase of the alternating-current generator "ACG" at an anode thereof and to the third terminal T3 at a cathode thereof.

The third thyristor TH3b is connected to the output terminal of the second phase of the alternating-current generator "ACG" at an anode thereof and to the third terminal T3 at a cathode thereof.

A second driving circuit "DRb" applies a drive signal to the gates of the second thyristors TH2 and TH4 and the third thyristors TH1b to TH3b to drive the second thyristors TH2 and TH4 and the third thyristors TH1b and TH3b, that is, the rectifying circuit 2. The alternating current output from the output terminal of each phase of the alternating-current generator "ACG" is rectified by the operations of the second thyristors TH2 and TH4 and the third thyristors TH1b to TH3b.

As shown in FIG. 4, the second battery detecting circuit 3b includes a seventh resistor r1b, an eighth resistor r2b and a third switch element (an NPN-type bipolar transistor) Tr1b, for example.

The seventh resistor r1b is connected to the third terminal T3 at one end thereof.

The eighth resistor r2b is connected between the other end of the seventh resistor r1b and the fourth terminal T4.

The third switch element Tr1b is connected to the fourth terminal T4 at one end (emitter) thereof, to the second driving circuit "DRb" at another end (collector) thereof and to the other end of the seventh resistor r1b at a control terminal (base) thereof. Although the third switch element Tr1b is a bipolar transistor in this example, the third switch element Tr1b may be an MOS transistor.

The second full-charge detecting circuit 4b includes a ninth resistor r3b, a tenth resistor r4b, a twelfth resistor r6b, a third capacitor (an average-value capacitor) C1b, a fourth switch element (an NPN-type bipolar transistor) Tr2b and second Zener diodes Ze1b and Ze2b.

The ninth resistor r3b is connected to the third terminal T3 at one end thereof.

The tenth resistor r4b is connected between the other end of the ninth resistor r3b and the fourth terminal T4.

The third capacitor C1b is connected to the other end of the ninth resistor r3b at one end thereof and to the fourth terminal T4 at the other end.

The fourth switch element Tr2b is connected to the control terminal (base) of the third switch element Tr1b at one end (collector) thereof, to the fourth terminal T4 at another end (emitter) thereof and to the one end of the third capacitor C1b at a control terminal (base) thereof. Although the fourth switch element Tr2b is a bipolar transistor in this example, the fourth switch element Tr2b may be an MOS transistor.

The twelfth resistor r6b is connected to the one end of the ninth resistor r3b at one end thereof and to the fourth terminal T4 at the other end thereof.

The second Zener diodes Ze1b and Ze2b are connected in series between the third terminal T3 and the one end of the ninth resistor r3b.

The second Zener diodes Ze1b and Ze2b are connected so as to be reverse biased between the third terminal T3 and the one end of the ninth resistor r3b. More specifically, a cathode of the second Zener diode Ze1b is connected to the third terminal T3, and an anode of the second Zener diode Ze1b is connected to a cathode of the second Zener diode Ze2b. An anode of the second Zener diode Ze2b is connected to the one end of the ninth resistor r3b.

The second differentiating circuit 5b includes an eleventh resistor r5b, a fourth capacitor C2b, a fourth diode D1b and a fifth diode D2b.

The eleventh resistor r5b is connected between the third terminal T3 and the one end of the third capacitor C1b.

The fourth capacitor C2b is connected in series with the tenth resistor r5b between the third terminal T3 and the one end of the third capacitor C1b.

The fourth diode D1b is connected to the one end of the third capacitor C1b at an anode thereof. In particular, the eleventh resistor r5b and the fourth capacitor C2b are connected in series between the third terminal T3 and an anode of the fourth diode D1b.

The fifth diode D2b is connected to the anode of the fourth diode D1b at a cathode thereof and to the fourth terminal T4 at an anode thereof.

The output of each phase of the alternating-current generator "ACG" is input to the second driving circuit "DRb". According to the outputs of the alternating-current generator "ACG", the second driving circuit "DRb" is configured to apply a drive signal to the gates of the third thyristors TH1b and TH3b and the second thyristors TH2 and TH4, thereby controlling the operation of the rectifying circuit 2 to rectify the alternating current, as described above.

The second driving circuit "DRb" is further configured to control the rectifying circuit 2 to perform or stop an operation to rectify the alternating current and supply power to the second battery "Bb" according to a signal at the other end (collector) (a current flowing to the collector) of the third switch element Tr1b.

For example, the second driving circuit "DRb" drives the rectifying circuit 2 when the third switch element Tr1b is in the on state. In other words, the second driving circuit "DRb" makes the rectifying circuit 2 perform an operation to rectify the alternating current and supply power to the second battery "Bb" if a current flows to the other end (collector) of the third switch element Tr1b.

On the other hand, the second driving circuit "DRb" stops the operation of the rectifying circuit 2 when the third switch element Tr1b is in the off state. In other words, the second driving circuit "DRb" makes the rectifying circuit 2 stop the operation to rectify the alternating current and supply power to the second battery "Bb" if no current flows to the other end (collector) of the third switch element Tr1b.

The switch circuit "SWc" is connected between the third terminal T3 and the one end of the seventh resistor, and turning on and off of the switch circuit "SWc" is controlled based on a signal at the one end of the second switch element Tr2.

For example, the switch circuit "SWc" is turned on if the second switch element Tr2 is turned on. In other words, the switch circuit "SWc" is turned on if a current flows to the one end (collector) of the second switch element Tr2.

On the other hand, the switch circuit "SWc" is turned off if the second switch element Tr2 is turned off. In other words, the switch circuit "SWc" is turned off if no current flows to the one end (collector) of the second switch element Tr2.

Next, an example of an operation of the battery charging apparatus 200 configured as described above will be described. The battery charging method for charging the first battery "B" is similar to the method according to the embodiment 1. The method of charging the second battery "Bb" is similar to the method of charging the first battery "B". In the following, differences between the methods will be mainly described.

For example, until the first battery "B" is fully charged, the second switch element Tr2 in the first full-charge detecting circuit 4 is in the off state, and no current flows.

As described above, the switch circuit "SWc" is turned off if the second switch element Tr2 is turned off. In other words, the switch circuit "SWc" is turned off if no current flows to the one end (collector) of the second switch element Tr2.

As a result, the first battery detecting circuit 3 is driven, and the second battery detecting circuit 3b is stopped. Therefore, the first driving circuit "DR" is driven, and the second driving circuit "DRb" is stopped.

Once the first battery "B" is fully charged, the second switch element Tr2 in the first full-charge detecting circuit 4 is turned on, and a current flows.

As described above, the switch circuit "SWc" is turned on if the second switch element Tr2 is turned on. In other words, the switch circuit "SWc" is turned on if a current flows to the one end (collector) of the second switch element Tr2.

As a result, the first battery detecting circuit 3 is stopped, and the second battery detecting circuit 3b is driven. Therefore, the first driving circuit "DR" is stopped, and the second driving circuit "DRb" is driven.

Such an operation of the battery charging apparatus 200 is similar to an operation during a battery chattering.

Therefore, the batteries are charged with at least a wave of alternating current each time the switching occurs, and thus there is a possibility that the battery voltage increase beyond a prescribed value because of the switching if the loads "R" and "Rb" connected to the batteries are light.

However, according to the embodiment 2, the battery charging apparatus 200 includes the first and second differentiating circuits 5 and 5b.

At the instant when the first and second batteries "B" and "Bb" are connected to the battery charging apparatus 200, the first and second differentiating circuits 5 and 5b can charge the average-value capacitors C1 and C1b in the first and second full-charge detecting circuits 4 and 4b to reduce the delay of the operation of the second and fourth switch elements Tr2 and Tr2b in the first and second full-charge detecting circuits 4 and 4b.

In this way, the battery voltage can be prevented from increasing more than required.

That is, the regulator 201 according to an aspect of the present invention can more appropriately prevent the battery voltage from increasing beyond the full-charge voltage.

As described above, as with the regulator according to the embodiment 1, the regulator according to this embodiment can more appropriately prevent the battery voltage from increasing beyond the full-charge voltage.

The embodiments are given for the illustrative purposes, and the scope of the present invention is not limited to the embodiments.

REFERENCE SIGN(S) LIST 1, 1A, 201 regulator
2 rectifying circuit 3 first battery detecting circuit
4 first full-charge detecting circuit
5 first differentiating circuit
100, 200, 100A battery charging apparatus
ACG alternating-current generator
TH1, TH3 first thyristor
TH2, TH4 second thyristor
TH5, TH6 third thyristor
T1 first terminal
T2 second terminal
T3 third terminal
T4 fourth terminal
B first battery
Ba second battery
R first external load
Ra second external load
r1 first resistor
r2 second resistor
r3 third resistor
r4 fourth resistor
r5 fifth resistor
r6 sixth resistor
r1b seventh resistor
r2b eighth resistor
r3b ninth resistor
r4b tenth resistor
r5b eleventh resistor
r6b twelfth resistor
Tr1 first switch element (an NPN-type bipolar transistor)
Tr2 second switch element (an NPN-type bipolar transistor)
Tr1b third switch element (an NPN-type bipolar transistor)
Tr2b fourth switch element (an NPN-type bipolar transistor)
C1 first capacitor (an average-value capacitor)
C2 second capacitor
C1b third capacitor (an average-value capacitor)
C2b fourth capacitor
D1 first diode
D2 second diode
D3 third diode
D1b fourth diode
D2b fifth diode
Ze1, Ze2 first Zener diode
Ze1b, Ze2b second Zener diode

The invention claimed is:

1. A regulator that controls charging, by an alternating-current generator, of a first battery connected between a first terminal and a second terminal, the regulator comprising:
    a rectifying circuit that rectifies an alternating current output from an output terminal of each phase of the alternating-current generator and outputs a charging current to the first battery;
    a first battery detecting circuit having a first resistor connected to the first terminal at a first end thereof a second resistor connected between a second end of the first resistor and the second terminal and a first switch element connected to the second terminal at a first end thereof and to the second end of the first resistor at a control terminal thereof;
    a first full-charge detecting circuit having a third resistor connected to the first terminal at a first end thereof, a fourth resistor connected between a second end of the third resistor and the second terminal, a first capacitor connected to the second end of the third resistor at a first end thereof and to the second terminal at a second end thereof and a second switch element connected to the control terminal of the first switch element at a first end thereof, to the second terminal at a second end thereof and to the first end of the first capacitor at a control terminal thereof;
    a first differentiating circuit having a fifth resistor connected between the first terminal and the first end of the first capacitor and a second capacitor connected in series with the fifth resistor between the first terminal and the first end of the first capacitor; and
    a first driving circuit that controls the rectifying circuit to rectify the alternating-current according to an output of the alternating-current generator and controls the rectifying circuit to perform or stop an operation to rectify the alternating current and supply power to the first battery according to a signal at the second end of the first switch element.

2. The regulator according to claim 1, wherein the first driving circuit makes
    the rectifying circuit perform the operation to rectify the alternating current and supply power to the first battery if the first switch element is in an on state, and
    the rectifying circuit stop the operation to rectify the alternating current and supply power to the first battery if the first switch element is in an off state.

3. The regulator according to claim 1, wherein the first driving circuit makes
    the rectifying circuit perform the operation to rectify the alternating current and supply power to the first battery if a current flows to the other end of the first switch element, and
    the rectifying circuit stop the operation to rectify the alternating current and supply power to the first battery if no current flows to the other end of the first switch element.

4. The regulator according to claim 1, wherein the first differentiating circuit further has:
    a first diode connected to the first end of the first capacitor at a cathode thereof; and
    a second diode connected to an anode of the first diode at a cathode thereof and to the second terminal at an anode thereof, and
    the fifth resistor and the second capacitor are connected in series between the first terminal and the anode of the first diode.

5. The regulator according to claim 1, wherein the first full-charge detecting circuit further comprises a first Zener diode that is connected so as to be reverse biased between the first terminal and the one end of the third resistor.

6. The regulator according to claim 5, wherein a plurality of the first Zener diodes are connected in series between the first terminal and the one end of the third resistor.

7. The regulator according to claim 1, wherein the first full-charge detecting circuit further comprises a sixth resistor that is connected to the one end of the third resistor at one end thereof and to the second terminal at the other end thereof.

8. The regulator according to claim 1, wherein the rectifying circuit comprises:
    a first thyristor that is connected to an output terminal of a first phase of the alternating-current generator at an anode thereof and to the first terminal at a cathode thereof; and
    a second thyristor that is connected to the output terminal of the first phase of the alternating-current generator at a cathode thereof and to the second terminal at an anode thereof.

9. The regulator according to claim 8, wherein the first driving circuit is configured to apply a drive signal to gates of the first thyristor and the second thyristor, thereby controlling the rectifying circuit.

10. The regulator according to claim 1, further comprising: a third diode that is connected so as to be forward biased between the second terminal and the other end of the rectifying circuit.

11. The regulator according to claim 1, wherein the regulator controls charging, by the alternating-current generator, of the first battery connected between the first terminal and the second terminal and a second battery connected between a third terminal and a fourth terminal, the rectifying circuit rectifies the alternating current output from the output terminal of each phase of the alternating-current generator and outputs a charging current to the first battery and the second battery, and the regulator further has:

a second battery detecting circuit having a seventh resistor connected to the third terminal at a first end thereof, an eighth resistor connected between a second end of the seventh resistor and the fourth terminal and a third switch element connected to the fourth terminal at a first end thereof and to the second end of the seventh resistor at a control terminal thereof;

a second full-charge detecting circuit having a ninth resistor connected to the third terminal at a first end thereof, a tenth resistor connected between a second end of the ninth resistor and the fourth terminal, a third capacitor connected to the second end of the ninth resistor at a first end thereof and to the fourth terminal at a second end thereof and a fourth switch element connected to the control terminal of the third switch element at a first end thereof, to the fourth terminal at a second end thereof and to the first end of the third capacitor at a control terminal thereof;

a second differentiating circuit having an eleventh resistor connected between the third terminal and the first end of the third capacitor and a fourth capacitor connected in series with the eleventh resistor between the third terminal and the first end of the third capacitor;

a second driving circuit that controls the rectifying circuit to rectify the alternating current according to an output of the alternating-current generator and controls the rectifying circuit to perform or stop the operation to rectify the alternating current and supply power to the first battery according to a signal at the second end of the third switch element; and a switch circuit that is connected between the third terminal and the first end of the seventh resistor and is turned on and off under the control of a signal at the first end of the second switch element.

12. The regulator according to claim 11, wherein the switch circuit is turned on if the second switch element is turned on and turned off if the second switch element is turned off.

13. The regulator according to claim 11, wherein the switch circuit is turned on if a current flows to the first end of the second switch element and turned off if no current flows to the first end of the second switch element.

14. The regulator according to claim 11, wherein the second full-charge detecting circuit further comprises a twelfth resistor that is connected to the one end of the ninth resistor at one end thereof and to the fourth terminal at the other end thereof.

15. A battery charging method that charges a first battery by using a regulator that controls charging, by an alternating-current generator, of the first battery connected between a first terminal and a second terminal, the regulator comprising: a rectifying circuit that rectifies an alternating current output from an output terminal of each phase of the alternating-current generator and outputs a charging current to the first battery; a first battery detecting circuit having a first resistor connected to the first terminal at a first end thereof a second resistor connected between a second end of the first resistor and the second terminal and a first switch element connected to the second terminal at a first end thereof and to the second end of the first resistor at a control terminal thereof; a first full-charge detecting circuit having a third resistor connected to the first terminal at a first end thereof, a fourth resistor connected between a second end of the third resistor and the second terminal, a first capacitor connected to the second end of the third resistor at a first end thereof and to the second terminal at a second end thereof and a second switch element connected to the control terminal of the first switch element at a first end thereof, to the second terminal at a second end thereof and to the first end of the first capacitor at a control terminal thereof; a first differentiating circuit having a fifth resistor connected between the first terminal and the first end of the first capacitor and a second capacitor connected in series with the fifth resistor between the first terminal and the first end of the first capacitor; and a first driving circuit that controls the rectifying circuit to rectify the alternating-current according to an output of the alternating-current generator and controls the rectifying circuit to perform or stop an operation to rectify the alternating current and supply power to the first battery according to a signal at the second end of the first switch element, the battery charging method comprising:

making the rectifying circuit perform the operation to rectify the alternating current and supply power to the first battery if the first switch element is in an on state, and making the rectifying circuit stop the operation to rectify the alternating current and supply power to the first battery if the first switch element is in an off state.

\* \* \* \* \*